(12) United States Patent
Srikrishna et al.

(10) Patent No.: US 7,505,426 B2
(45) Date of Patent: Mar. 17, 2009

(54) MULTI-CHANNEL MESH NETWORK

(75) Inventors: Devabhaktuni Srikrishna, San Mateo, CA (US); Amalavoyal Chari, San Mateo, CA (US)

(73) Assignee: Tropos Networks, Sunnyvale, CA (US)

( * ) Notice: Subject to any disclaimer, the term of this patent is extended or adjusted under 35 U.S.C. 154(b) by 785 days.

(21) Appl. No.: 10/816,734

(22) Filed: Apr. 2, 2004

(65) Prior Publication Data

US 2004/0264379 A1   Dec. 30, 2004

Related U.S. Application Data

(63) Continuation-in-part of application No. 10/693,721, filed on Oct. 25, 2003, which is a continuation of application No. 09/751,262, filed on Dec. 29, 2000, now Pat. No. 6,704,301.

(51) Int. Cl.
*H04H 20/71* (2008.01)
(52) U.S. Cl. .................. 370/312; 455/500; 455/455; 370/334; 370/432
(58) Field of Classification Search ............ 370/408, 370/406, 392, 218, 238, 401, 410
See application file for complete search history.

(56) References Cited

U.S. PATENT DOCUMENTS

| | | | | |
|---|---|---|---|---|
| 5,212,806 A | * | 5/1993 | Natarajan | 455/525 |
| 5,471,469 A | * | 11/1995 | Flammer et al. | 370/346 |
| 5,515,509 A | * | 5/1996 | Rom | 709/228 |
| 5,563,881 A | * | 10/1996 | Perelman et al. | 370/428 |
| 5,636,220 A | * | 6/1997 | Vook et al. | 370/338 |
| 5,654,959 A | * | 8/1997 | Baker et al. | 370/331 |
| 5,684,800 A | * | 11/1997 | Dobbins et al. | 370/401 |
| 5,740,366 A | * | 4/1998 | Mahany et al. | 709/227 |
| 5,812,531 A | * | 9/1998 | Cheung et al. | 370/255 |
| 5,901,362 A | * | 5/1999 | Cheung et al. | 455/525 |
| 5,987,011 A | * | 11/1999 | Toh | 370/331 |
| 5,987,012 A | * | 11/1999 | Bruckert et al. | 370/331 |
| 5,987,062 A | * | 11/1999 | Engwer et al. | 375/225 |
| 6,009,074 A | * | 12/1999 | Kim et al. | 370/209 |
| 6,044,062 A | * | 3/2000 | Brownrigg et al. | 370/238 |
| 6,097,703 A | * | 8/2000 | Larsen et al. | 370/254 |
| 6,104,712 A | * | 8/2000 | Robert et al. | 370/389 |
| 6,134,231 A | * | 10/2000 | Wright | 370/348 |
| 6,173,191 B1 | * | 1/2001 | Jennings, III | 455/562.1 |
| 6,292,508 B1 | * | 9/2001 | Hong et al. | 375/134 |
| 6,304,556 B1 | * | 10/2001 | Haas | 370/254 |

(Continued)

FOREIGN PATENT DOCUMENTS

GB   2271693 A   *   4/1994

(Continued)

*Primary Examiner*—Edan Orgad
*Assistant Examiner*—Salman Ahmed
(74) *Attorney, Agent, or Firm*—Brian R. Short

(57) ABSTRACT

A method of selecting at least one routing path between and access node and a gateway is provided. The method includes the access node receiving over a plurality of channels, indicators from at least one upstream access node, the indicators providing information of selected upstream paths between each of the upstream access nodes and upstream gateways. The access node determines an optimal set of routing paths between the access node and at least one upstream gateway, based upon the indicators, the optimal set of routing paths including a combination of paths over multiple channels.

11 Claims, 7 Drawing Sheets

U.S. PATENT DOCUMENTS

| | | | |
|---|---|---|---|
| 6,342,844 B1 * | 1/2002 | Rozin | 340/933 |
| 6,370,381 B1 * | 4/2002 | Minnick et al. | 455/445 |
| 6,418,299 B1 * | 7/2002 | Ramanathan | 455/7 |
| 6,421,731 B1 * | 7/2002 | Ciotti et al. | 709/238 |
| 6,456,599 B1 * | 9/2002 | Elliott | 370/254 |
| 6,564,074 B2 * | 5/2003 | Romans | 455/574 |
| 6,611,231 B2 | 8/2003 | Crilly, Jr. et al. | 342/378 |
| 6,640,087 B2 | 10/2003 | Reed et al. | 455/11.1 |
| 6,661,781 B1 | 12/2003 | Chitre et al. | 370/330 |
| 6,667,957 B1 * | 12/2003 | Corson et al. | 370/238 |
| 6,684,030 B1 | 1/2004 | Taylor et al. | 398/59 |
| 6,704,301 B2 * | 3/2004 | Chari et al. | 370/351 |
| 6,901,048 B1 * | 5/2005 | Wang et al. | 370/228 |
| 7,031,266 B1 * | 4/2006 | Patel et al. | 370/254 |
| 7,058,021 B2 * | 6/2006 | Srikrishna et al. | 370/252 |
| 7,095,732 B1 * | 8/2006 | Watson, Jr. | 370/346 |
| 7,212,504 B2 * | 5/2007 | Belcea | 370/315 |
| 7,330,693 B1 * | 2/2008 | Goss | 455/3.01 |
| 2002/0075940 A1 * | 6/2002 | Haartsen | 375/132 |
| 2003/0117966 A1 | 6/2003 | Chen | 370/255 |
| 2004/0001457 A1 | 1/2004 | Chitrapu | 370/328 |
| 2005/0176436 A1 * | 8/2005 | Mantravadi et al. | 455/450 |
| 2005/0271006 A1 * | 12/2005 | Chari et al. | 370/329 |
| 2006/0233137 A1 * | 10/2006 | Dantu et al. | 370/331 |
| 2006/0233237 A1 * | 10/2006 | Lu et al. | 375/240.03 |

FOREIGN PATENT DOCUMENTS

| | | |
|---|---|---|
| GB | 2271693 A * | 4/1994 |
| WO | WO 0110093 A1 * | 2/2001 |

* cited by examiner

THE ACCESS NODE RECEIVING OVER A PLURALITY OF CHANNELS, INDICATORS FROM AT LEAST ONE UPSTREAM ACCESS NODE, THE INDICATORS PROVIDING INFORMATION OF SELECTED UPSTREAM PATHS BETWEEN EACH OF THE UPSTREAM ACCESS NODES AND UPSTREAM GATEWAYS

610

THE ACCESS NODE DETERMINING AN OPTIMAL SET OF ROUTING PATHS BETWEEN THE ACCESS NODE AND AT LEAST ONE UPSTREAM GATEWAY, BASED UPON THE INDICATORS, THE OPTIMAL SET OF ROUTING PATHS INCLUDING A COMBINATION OF PATHS OVER MULTIPLE CHANNELS

EACH ACCESS NODE RECEIVING OVER A PLURALITY OF CHANNELS, INDICATORS FROM AT LEAST ONE UPSTREAM DEVICE

710

IF THE AT LEAST ONE UPSTREAM DEVICE IS AN UPSTREAM ACCESS NODE, THE INDICATORS PROVIDING INFORMATION OF SELECTED UPSTREAM PATHS BETWEEN EACH OF THE UPSTREAM ACCESS NODES AND UPSTREAM GATEWAYS

720

EACH ACCESS NODE DETERMINING AN OPTIMAL SET OF ROUTING PATHS BETWEEN THE ACCESS NODE AND AT LEAST ONE UPSTREAM GATEWAY, BASED UPON THE INDICATORS, THE OPTIMAL SET OF ROUTING PATHS INCLUDING A COMBINATION OF PATHS OVER MULTIPLE CHANNELS

MULTI-CHANNEL MESH NETWORK

CROSS REFERENCE TO RELATED APPLICATIONS

This application is a continuation-in-part (CIP) of U.S. patent application Ser. No. 10/693,721 filed on Oct. 25, 2003, titled "Method and Apparatus to Provide a Routing Protocol for Wireless Devices" which is a continuation of U.S. patent application Ser. No. 09/751,262 filed on Dec. 29, 2000, having the same title, and granted as U.S. Pat. No. 6,704,301.

FIELD OF THE INVENTION

The invention relates generally to communication networks. More particularly, the invention relates to a multi-channel mesh network.

BACKGROUND OF THE INVENTION

Wireless access devices are becoming more prevalent. Wireless access can be implemented in many different forms, including connecting a wireless access device (client) through a wireless mesh network that provides connection to a wired device. FIG. 1 shows a wireless mesh network that includes a client device 140. The client device 140 is wirelessly connected to an access node 130. The wireless access node 130 is wirelessly connected to a wired gateway 110 through another wireless access node 120. The wired gateway 110 can provide access to the internet 100.

The transfer of information from the client 140 to the gateway 110 is generally two-way. That is, generally information flows from the client device 140 to the gateway 110 (generally referred to as upstream traffic) and information flows from the gateway 110 to the client device 140 (generally referred to as downstream traffic). The amount of data that can flow between the gateway 110 and the client device 140 is called throughput. It is desirable to maximize the throughput of wireless mesh networks.

The communication between the gateway 110, the access nodes 120, 130 and the clients 140 is over a predefined transmission channel. For example, a specific range of the frequency spectrum is typically allocated for the transmission between the devices. Typically, particular frequencies of transmission operated better in particular environments. For example, certain ranges of transmission frequencies suffer from more multi-path and fading than other ranges of frequency transmission in a particular setting, such as, a downtown with car traffic. Other ranges of transmission frequencies suffer more multi-path and fading than other ranges of frequency transmission in other settings, such as, a forest.

Mesh networks can alleviate the effects of fading and multi-path by providing routing path alternatives. However, mesh networks having a single transmission frequency can still suffer from transmission signal degradation.

Upstream traffic of an access node can suffer from congestion if a large number of clients are connected to the access node. That is, a large number of clients demanding high data rates can stress the upstream data path between the access node and the gateway.

It is desirable to have a mesh network having improved throughput, and reliable communication between access nodes and gateways of the mesh network.

SUMMARY OF THE INVENTION

The invention includes an apparatus and method for a multiple channel mesh network that provides enhanced throughput and transmission reliability.

A first embodiment of the invention includes a method of selecting at least one routing path between and access node and a gateway. The method includes the access node receiving over a plurality of channels, indicators from at least one upstream access node, the indicators providing information of selected upstream paths between each of the upstream access nodes and upstream gateways. The access node determines an optimal set of routing paths between the access node and at least one upstream gateway, based upon the indicators, the optimal set of routing paths including a combination of paths over multiple channels.

Another embodiment of the invention includes a method of routing data packets through a wireless mesh network. The mesh network includes at least one gateway and a plurality of access nodes. The method includes each access node receiving over a plurality of channels, indicators from at least one upstream device. If the at least one upstream device is an upstream access node, the indicators provide information of selected upstream paths between each of the upstream access nodes and upstream gateways, and each access node determines an optimal set of routing paths between the access node and at least one upstream gateway, based upon the indicators, the optimal set of routing paths including a combination of paths over multiple channels.

Another embodiment of the invention includes an access node. The access node includes a plurality of radios operable on a plurality of transmission channels, the radios receiving over a plurality of channels, indicators from at least one upstream access node, the indicators providing information of selected upstream paths between each of the upstream access nodes and upstream gateways. The access node further includes a means for determining an optimal set of routing paths between the access node and at least one upstream gateway, based upon the indicators, the optimal set of routing paths including a combination of paths over multiple channels.

Another embodiment of the invention includes a mesh network. The mesh network includes at least one gateway, each gateway transmitting beacons through a plurality of transmission channels. The mesh network includes plurality of access nodes. Each access node receives beacons through at least one of the transmission channels. Each access node selects routing paths based upon path indicator information within the received beacons, the routing paths selected from the plurality of transmission channels, the selected set of routing paths including a combination of paths over multiple channels. The mesh network further includes a client, the client receiving beacons through at least one of the transmission channels from at least one of the access nodes.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 6 is a flow chart showing steps included within an embodiment of the invention.

FIG. 7 is a flow chart showing steps included within another embodiment of the invention.

DETAILED DESCRIPTION

Figure 1:
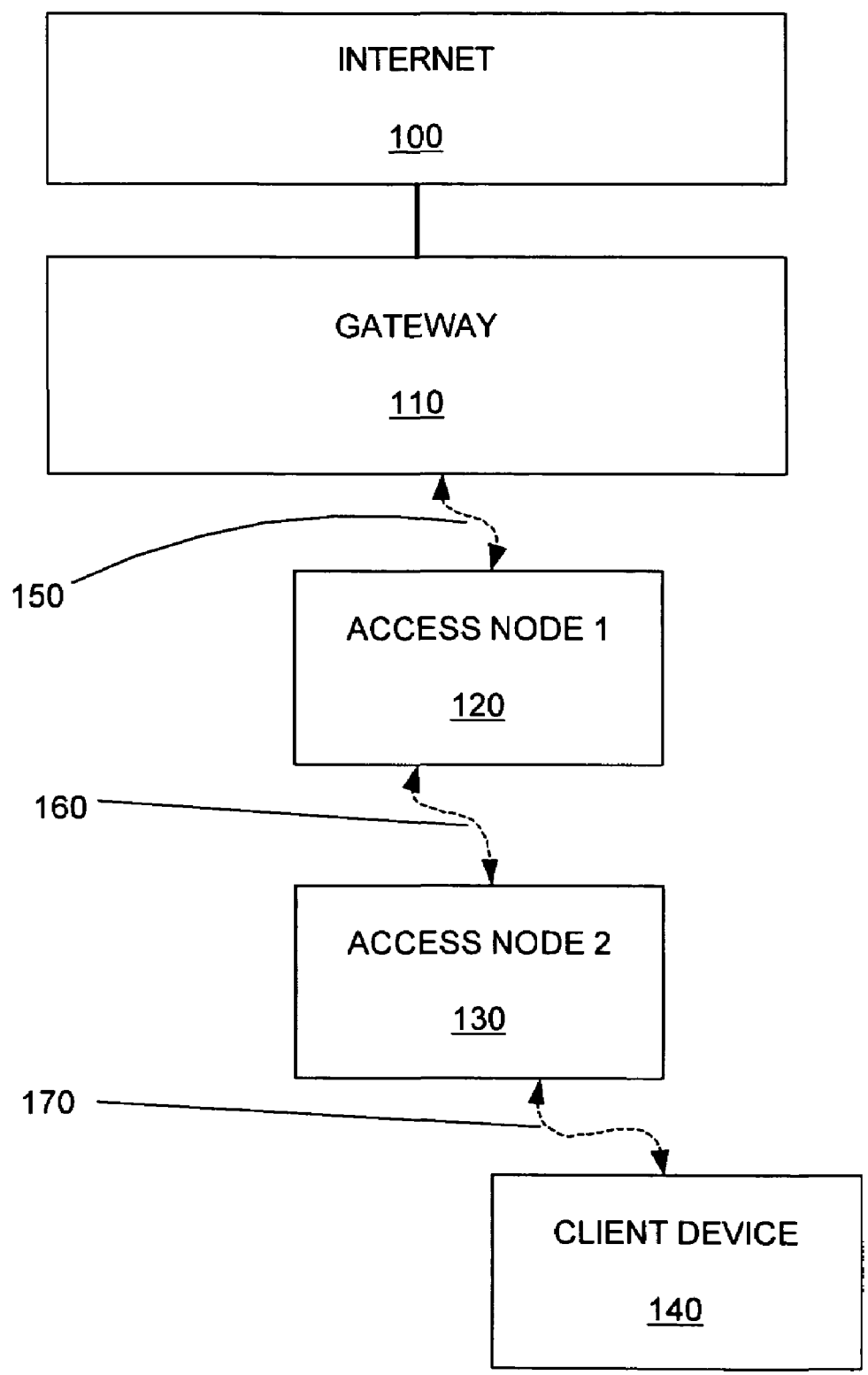
FIG. 1 shows a network device connected to a client through a mesh network.

As shown in the drawings for purposes of illustration, the invention is embodied in a multiple channel mesh network that provides enhanced throughput and transmission reliability.

Figure 2:
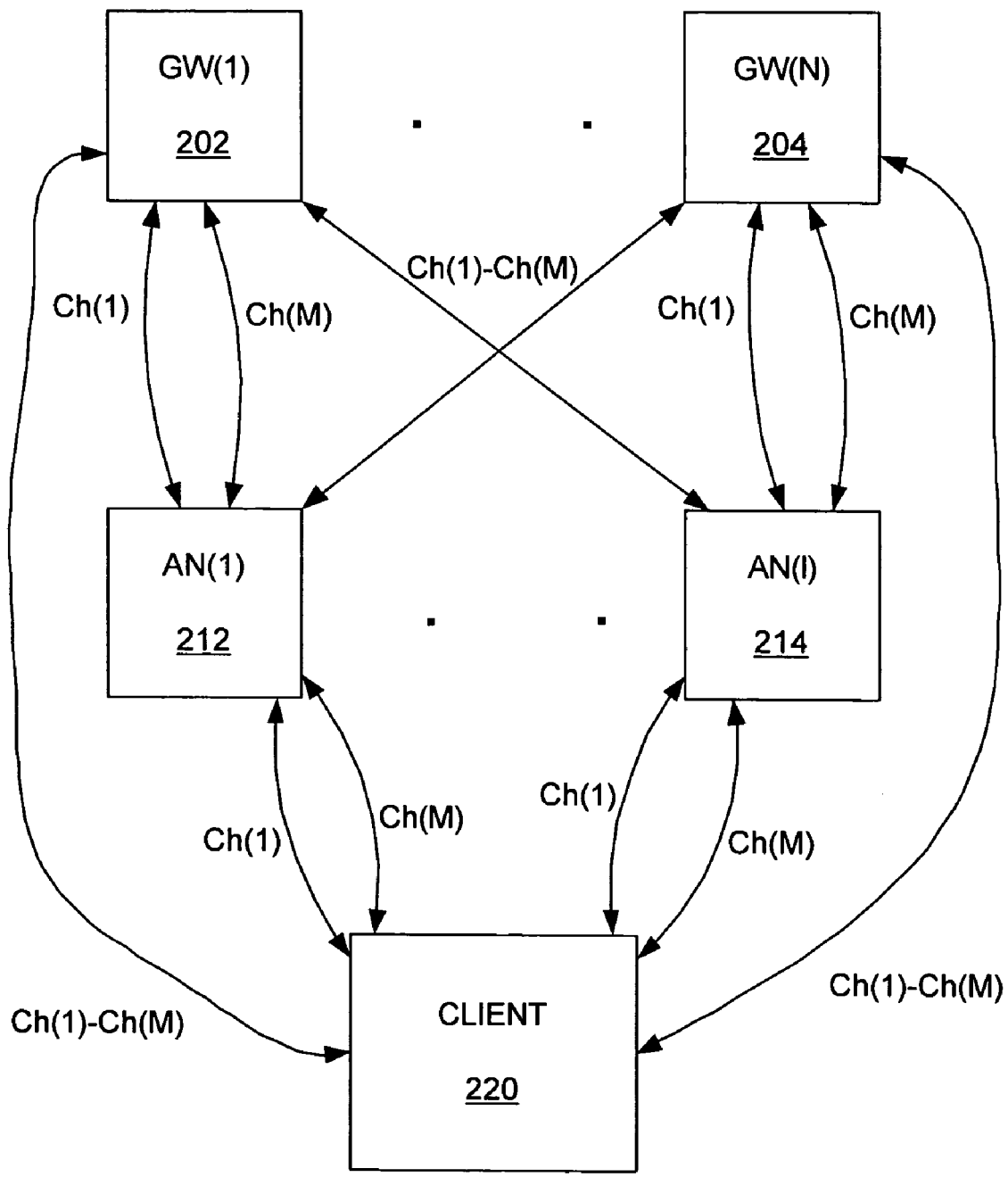
FIG. 2 shows a mesh network that includes multiple transmission channels, according to an embodiment of the invention.

FIG. 2 shows a mesh network that includes multiple transmission channels. The mesh network includes gateways 202, 204, access nodes 212, 214 and a client 220. Generally, wireless transmission signals provide communication between the gateways 202, 204, the access nodes 212, 214 and client 220. As shown in FIG. 2, the transmission signals can travel through one or more of M available transmission channels Ch1-ChM.

A gateway is typically a wired device that provides a wireless access node access to a network. The gateway is a network entity that maintains an address-mapping table for each client. The address-mapping table generally includes a MAC-IP address mapping for the client devices. As will be described, one or more gateways can correspond with each access node, and each gateway can service several access nodes.

An access node generally includes any point of attachment of a client with the mesh network. The access node can be a wireless access point, a wired access point, a router, a hub, a gateway, or any other networking device capable of attachment to a client.

A client generally can include a laptop computer, a personal digital assistant (PDA), a cell-phone, or any other device that includes as interface card adaptable for use with the mesh network of the invention.

A downlink interface is a network interface (logical or physical) that attaches an access node to a client device. An access node can have more that one downlink interface. All other interfaces other than downlink interfaces are termed uplink interfaces.

The mesh network has been generalized to include N gateways 202, 204. Depending upon the quality of each of the available communication channels available, one or more gateways 202, 204 can maintain communication with each client Multiple transmission channels (Ch1-ChM) exist between the devices of the mesh network. The channels are generalized to include M channels, represented as channel CH1 to channel ChM. The multiple channels available for communication between the devices (gateways, access nodes and clients), allows the mesh network to optimally select one or more of the channels for communication between each of the devices. The channels selection can be based upon maximal throughput of communication between a client and a gateway, or for maximal reliability of communication between a client and a gateway or some other criteria. For example, a first channel (such as an 802.11(g)) transmission channel may provide greater data transmission rates than all other available channels, and another channel (such as an 802.11(b)) transmission channel may provide more reliable data transmission rates than all other available channels. A selection may include one transmission channel or the other, or may include both depending upon the selection criteria.

An embodiment of the mesh network includes the gateways 202, 204 transmitting beacons. The beacons can be transmitted through a plurality of the available transmission channels Ch1-ChM. The beacons are received by access nodes 212, 214 if the access nodes 212, 214 are physically located with respect to the transmitting gateway such that at least one of the transmission channels allows successful transmission of the beacons to the access nodes 212, 214. Access nodes 212, 214 that are able to receive a beacon, re-broadcast a corresponding beacon for reception by downstream devices (other access nodes or clients). This permits each access node to determine at least one path to one or more gateways.

For one embodiment, the access nodes transmit reverse beacons back to the gateways. Thus, the gateway has a full path to each access node, and each access node has a path to its nearest neighbors (gateway or access nodes), and knows which of those paths leads to the gateway. Therefore, the access node and the gateway can communicate.

For another embodiment, when an access node wishes to connect the gateway, it sends a connection request, through the known path to the at least one gateway. This connection request includes at least one known path to the gateway. When the at least one gateway receives the request, it becomes aware of the path to the requesting access node, as well as all intervening nodes. The at least one gateway uses this information to respond to the request, and add the data to its routing table/access node tree.

Each access node receives beacons that provide indicators of available routing paths to an upstream gateway. When a gateway 202, 204 broadcasts a beacon, the beacon is received by all first-level access nodes. The beacon is used to establish a route from each access node to the gateway. First level access nodes are defined by the fact that they receive data directly from the gateway. The first level access nodes rebroadcast the beacon data over multiple channels, attaching additional path data to it. The additional path information indicates to the second level access nodes that the path to the gateway includes the first level access node.

For one embodiment, the link quality of the beacon received determines whether that beacon is rebroadcast by the system. If the quality of the beacon is above a determined threshold, it is rebroadcast. Otherwise, it is not. For one embodiment, link quality is determined by persistence, i.e. the number of times in the last several routing cycles that the particular beacon was received. For one embodiment, the link quality reflects the reliability of paths to the gateway, as determined by the beacon being available for a reasonable time. For one embodiment, the link quality reflects the end-to-end throughput between the access node and the gateway. The link quality is determined by continuously monitoring the beacons as they are received in every cycle. Whenever the beacon is not received in a cycle, the link quality associated with that path is decreased. The beacon is only transmitted if its link quality is sufficiently high.

For another embodiment, the depth of re-broadcast is determined for the system. Thus, for example, an access node may rebroadcast a beacon only if there are 5 or fewer hops between the access node and the gateway. For another embodiment, other link quality factors, such as traffic congestion, battery status of upstream access nodes, thickness of the pipeline, backend (i.e. gateway) capacity, latency, or other factors may be used to determine whether the beacon should be rebroadcast.

After every access node has received at least one beacon, every access node has the address of at least one upstream access node, over multiple transmission channels, which leads to at least one of the gateways. For one embodiment, each access node also has at least one path to the gateway. A reverse beacon is then sent out through the access nodes, up to the gateways. The reverse beacon permits the gateways to establish a full access node trees, enabling the gateways to access all access nodes. Furthermore, the reverse beacon informs each access node what downstream nodes access the gateways through this access node.

Each access node has at least one upstream node, and may have a plurality of downstream nodes. Upstream nodes are the nodes that are between the access node and the gateway. For a level one access node, there is only one upstream node to at least one of the gateways. For a level four access node, there are four upstream nodes, which defines one of the access node's paths to the gateway. Downstream nodes are nodes that receive the beacon from a particular access node, and that define at least one of their paths to the gateway through that access node. Due to the fact that multiple transmission channels are available, a particular node could be a level one access node over one set of transmission channels, and a level two, three or four node, over another set of transmission channels. Therefore the level of the access node is determined in reference to the set of transmission channels.

For another embodiment, the reverse beacon need not be sent. Not sending the reverse beacon means that the gateway can't initiate sending a message to an access node. Rather, the gateway must wait for a request from the access node. That request includes a path to the access node. Also, the only method of access-node-to-access-node communication in such a system is by sending the message through the gateway. In some wireless systems this is sufficient because access to the gateway, which provides access to the general Internet, is the primary use.

Although only a limited number of gateways 202, 204 and access nodes 212, 214 are shown in FIG. 2, it should be understood by one skilled in the art that an almost unlimited numbers of access nodes 212, 214, at almost unlimited number of hops from the gateways 202, 204 may be implemented. For one embodiment, the gateway capacity determines the number of access nodes that may be coupled to the gateway. Thus, for example, if the gateway can handle 10 simultaneous connections to various access nodes, then up to 100 access nodes may be coupled to the gateway. This indicates that no more than 1-in-10 access nodes access the gateway at any one time. This assures that the access nodes never have to wait for the gateway. Depending on the latency that is acceptable, which varies by function (e.g. voice v. data latency), the gateway may support a certain number of access nodes of each function.

The gateways play a central role in the discovery of routes by the access nodes. At periodic intervals, the gateways each originate a "beacon" which is broadcast to all access nodes within receiving range of the gateways, over some or all available transmission channels. The time interval between successive broadcasts of the beacons defines a routing cycle. The beacon is a routing packet—a short data packet that contains the address of the gateway. For one embodiment, the beacon includes the following information: (1) a sequence number which identifies which routing cycle it initiates, 2) the address (MAC or IP) of the gateway, 3) a Traffic Monitoring Code (TMC). For one embodiment the TMC may be omitted.

For one embodiment, the address of the gateway may be included only in the ethernet header or IP header of the beacon message. For one embodiment, the beacon may contain additional data such as the bandwidth of the wired connection.

Operationally, the embodiment of FIG. 2 includes methods of selecting at least one routing path between and access node and a gateway. The methods can include each access node receiving over a plurality of channels, indicators from at least one upstream access node or gateway, the indicators providing information of selected upstream paths between each of the upstream access nodes and upstream gateways. The access nodes determine an optimal set of routing paths between the access node and at least one upstream gateway, based upon the indicators, the optimal set of routing paths including a combination of paths over multiple channels.

Figure 3:
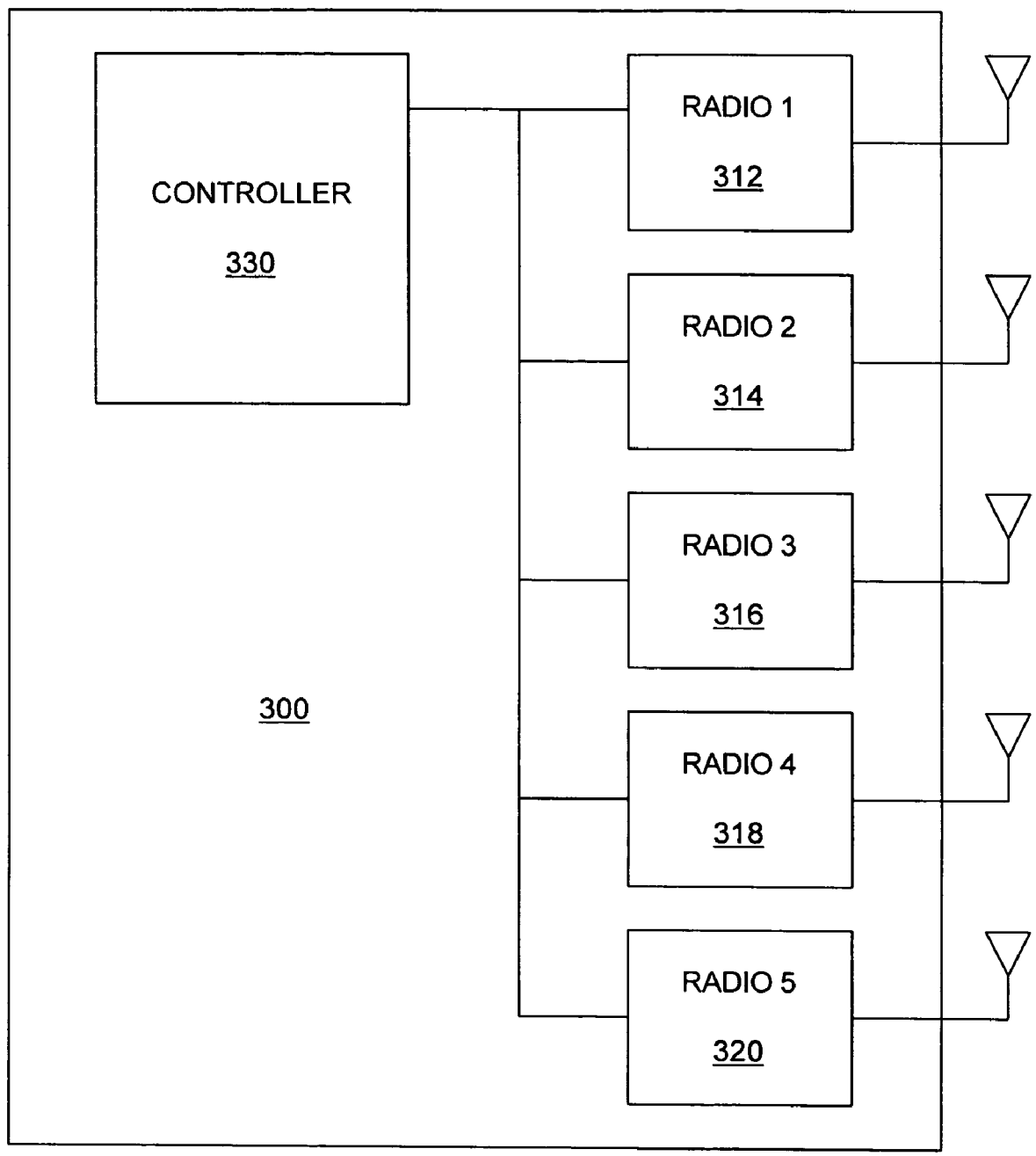
FIG. 3 shows an access node according to an embodiment of the invention.

FIG. 3 shows an access node 300 that includes multiple radios 312, 314, 316, 318, 320, operable over multiple transmission channels. For example, a first radio 312 and a second radio 314 can be operable with transmission signals of a first transmission channel, a third radio 316 and a fourth radio 318 can be operable with transmission signals of a second transmission channel, and a fifth radio can be operable with transmission signals of a third transmission channel. Any combination of transmission channels can be operable at any given time, for both upstream communication and downstream communication. That is, for example, the first radio 312 and the third radio 316 may simultaneously provide upstream communication with one or more upstream devices, while the second radio 314, the fourth radio 318 and the fifth radio 320 may simultaneously provide downstream communication with one or more downstream devices. Alternatively, for example, the second radio 314 may provide upstream communication with an upstream device, and the third radio 316 may provide downstream communication with a downstream device, while the first radio 312, the fourth radio 318 and the fifth radio 320 are non-operating. Any combination of radios operable with upstream and downstream devices is possible.

A controller 330 provides control over which of the radios 312, 314, 316, 318, 320 are operable with which upstream and downstream devices. The determination between which radios are operable in either the downstream or upstream communications can be made by analyzing routing indicators within beacons received from upstream devices.

Generally, an access node of the mesh network of FIG. 2, includes a plurality of radios operable on a plurality of transmission channels. The radios receive over a plurality of channels, indicators from at least one upstream access node. The indicators provide information of selected upstream paths between each of the upstream access nodes and upstream gateways. The access node further includes a means for determining an optimal set of routing paths between the access node and at least one upstream gateway, based upon the indicators. Generally, the optimal set of routing paths includes a combination of paths over multiple channels.

Exemplary transmission channels include transmission channels according to at least one of 802.11(a), 802.11(b), 802.11(g), 802.11(n), 802.16 transmission protocols. Additional transmission protocols operating over licensed or unlicensed wireless frequencies may also be used. Determining an optimal set of routing paths can include determining a path quality of the available paths, and selecting the optimal paths based upon selection criteria. Exemplary selection criteria includes information throughput of the routing paths, or the number of hops of the routing paths. The number of hops can be determined by including hop indicators within the beacons, and incrementing the hop indicators with each hop.

Generally, the optimal set of routing paths includes a combination of paths through multiple upstream access nodes. The paths are generally determined by the path indicators. Exemplary path indicators include beacons that are initially transmitted from gateways, over multiple transmission channels. All access nodes receiving beacons can modify the beacons with upstream routing information, and then retransmit the beacons over multiple channels.

Figure 4:
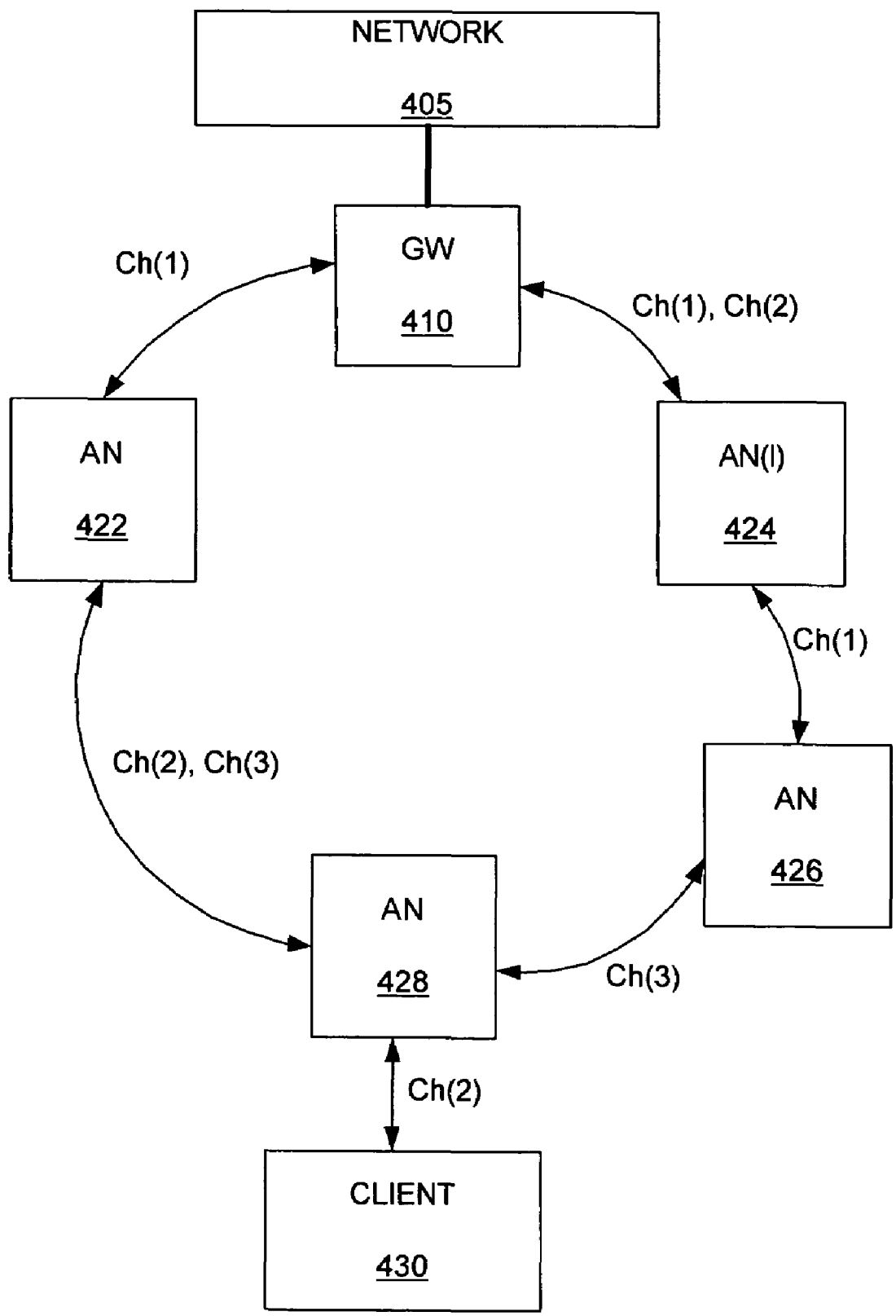
FIG. 4 shows a mesh network that illustrates principles of an embodiment of the invention.
Figure 5:
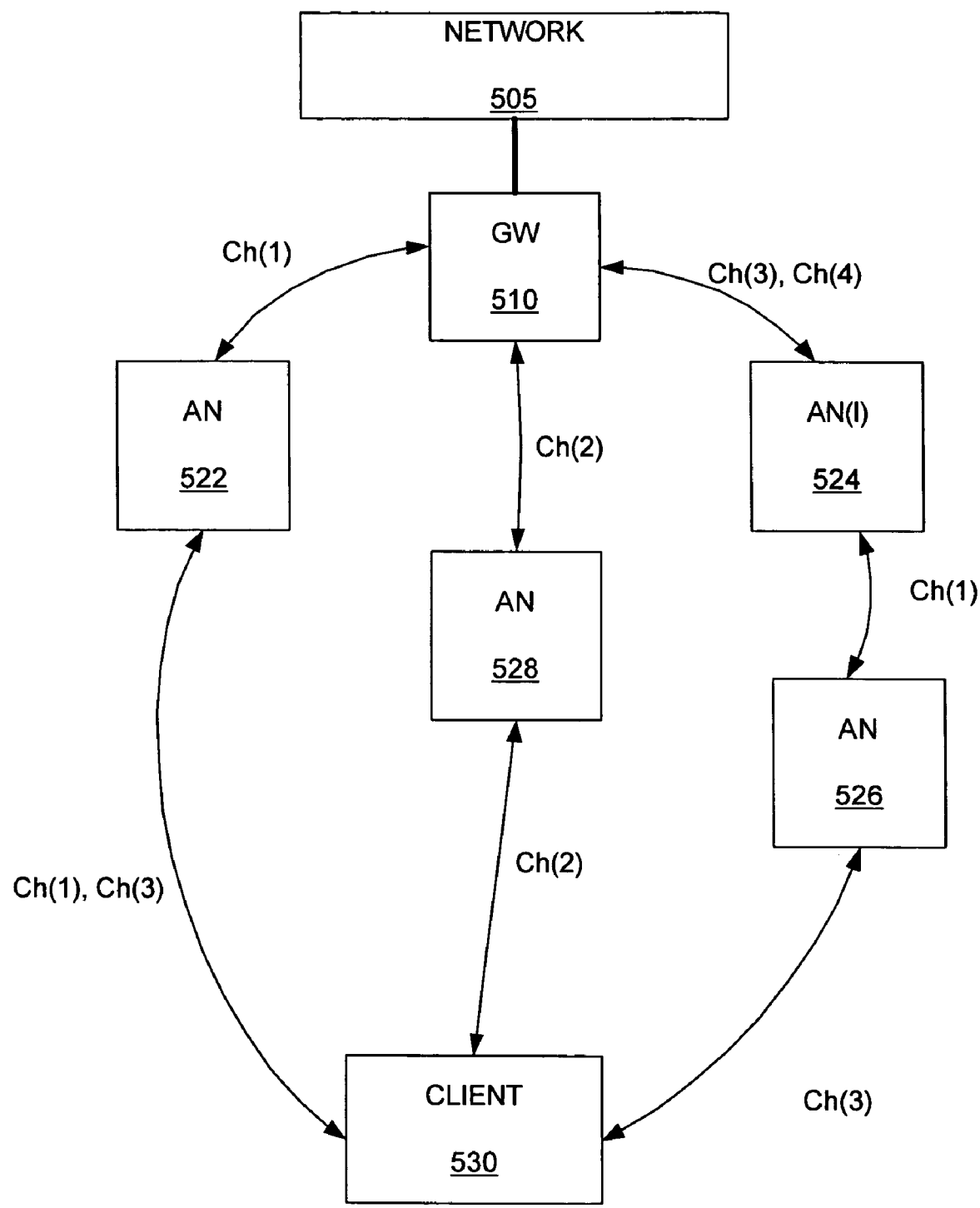
FIG. 5 shows another mesh network that illustrates additional principles of an embodiment of the invention.

FIGS. 4 and 5 show exemplary mesh networks that include at least some of the principles described. The embodiments are provided to aid in understanding the breadth of the principles, and are not to be limiting.

FIG. 4 shows a mesh network that includes a gateway 410 connected to a network 405, access nodes 422, 424, 426, 428, and a client 430. The client 430 of FIG. 4 includes only a single transmission channel Ch(2). The single transmission channel Ch(2), can be any one of a number of possible channels. For example, the single channel could be 802.11(a), 802.11(b), 802.11(g), 802.11(n), or any other available transmission channel. The mesh network connections upstream from the client can include multiple paths over a combination of transmission channels. Here, the client 430 has two upstream data paths to the gateway 410 through a combination of transmission channels Ch(1), Ch(2), Ch(3).

Each access node receives beacons over multiple transmission channels that originate at the gateway 410. Beacons that are received and include a predetermined level of transmission quality, are modified by the receiving access node, and retransmitted. The beacons are modified to include the routing information of the receiving access node. One embodiment includes the access nodes selecting the beacons of the transmission channels having the best transmission quality. Another embodiment includes the access node selecting a combination of beacons received over multiple transmission channels. Effectively, links between gateways and access nodes that include multiple transmission channels include greater bandwidths than single transmission channel links. Therefore, higher bandwidth and more reliable links are possible with multiple transmission channel links than with single transmission channel links.

The gateway 410 is typically hardwired to the network. The embodiment of FIG. 4 includes one gateway 410. However, the access nodes of FIG. 4 can link to multiple gateways if this improves the bandwidth and reliability of the mesh network.

As shown, the link between the gateway 410 and the access node 422 is over the transmission channel Ch(1). The access node 422 selected the beacons transmitted from the gateway 410 over the transmission channel Ch(1) over the beacons transmitted over other available channels, and beacons transmitted from other access nodes and other gateways.

The link between the access node 428 and the access node 422 is over the transmission channels Ch(2) and Ch(3). The access node 428 selected the beacons transmitted from the access node 422 over the combination of transmission channels Ch(2) and Ch(3) over the beacons transmitted from other available channels, or beacons transmitted from other access nodes or gateways.

The link between the gateway 410 and the access node 424 is over the transmission channels Ch(1) and Ch(2). The access node 424 selected the beacons transmitted from the gateway 410 over the combination of transmission channels Ch(1) and Ch(2) over the beacons transmitted from other available channels, or beacons transmitted from other access nodes or gateways.

The link between the access node 426 and the access node 424 is over the transmission channels Ch(1). The access node 426 selected the beacons transmitted from the access node 424 over the transmission channels Ch(1) over the beacons transmitted from other available channels, or beacons transmitted from other access nodes or gateways.

The link between the access node 428 and the access node 426 is over the transmission channels Ch(3). The access node 428 selected the beacons transmitted from the access node 426 over the transmission channels Ch(3) over the beacons transmitted from other available channels, or beacons transmitted from other access nodes or gateways.

The access node 428 includes two data paths to the gateway 410. The two data paths include beacons that as a combination path, provides the upstream data path that best meets the selection criteria of the access node 428. As previously described, the selection criteria can include data throughput, and path reliability.

FIG. 5 shows a mesh network that include a gateway 510 connected to a network 505, access nodes 522, 524, 526, and a client 530. The client 530 of this embodiment includes multiple transmission channels Ch(1), Ch(2), Ch(3). The client 530 as shown, include multiple data paths to the gateway 510 through multiple access node over multiple combinations of transmission channels Ch(1), Ch(2), Ch(3), Ch(4).

FIG. 6 is a flow chart showing steps included within a method of selecting at least one routing path between an access node and a gateway. A first step 610 includes the access node receiving over a plurality of channels, indicators from at least one upstream access node, the indicators providing information of selected upstream paths between each of the upstream access nodes and upstream gateways. A second step 620 includes the access node determining an optimal set of routing paths between the access node and at least one upstream gateway, based upon the indicators, the optimal set of routing paths including a combination of paths over multiple channels.

The plurality of channels can include, but are not limited to transmission channels according to at least one of 802.11(a), 802.11(b), 802.11(g), 802.11(n), 802.16 transmission protocols. The access node can determine an optimal set of routing paths by determining a path quality of the available paths, and selecting the optimal paths based upon a selection criteria. Exemplary selection criteria include information throughput of the routing paths and a number of hops of the routing paths. The optimal set of routing paths typically includes at least one of a plurality of possible routing paths. The optimal set of routing paths generally includes a combination of paths through multiple upstream access nodes. The optimal routing paths can include combinations of individual channels or combinations of multiple channels.

The indicators can include beacons originating at the gateways. The beacons are retransmitted by the upstream access nodes after the beacons have been modified to include selected upstream routing information. The beacons can include hop indicators that are incremented with each hop. As stated above, a hop is that transmission of a beacon from a gateway or access node, to a downstream access node. The access nodes can also send reverse beacons back to the gateways. The reverse beacons allow the gateways to construct a client tree, thereby providing each gateway with at least one path including multiple channels to all clients and access nodes.

FIG. 7 is a flow chart showing steps included within another embodiment of a method of routing data packets through a wireless mesh network. The mesh network includes at least one gateway and a plurality of access nodes. A first step 710 includes each access node receiving over a plurality of channels, indicators from at least one upstream device. A second step 720 includes if the at least one upstream device is an upstream access node, the indicators providing information of selected upstream paths between each of the upstream access nodes and upstream gateways. A third step 730 includes each access node determining an optimal set of routing paths between the access node and at least one upstream gateway, based upon the indicators, the optimal set of routing paths including a combination of paths over multiple channels.

As stated above, the plurality of channels can include, but are not limited to transmission channels according to at least one of 802.11(a), 802.11(b), 802.11(g), 802.11(n), 802.16 transmission protocols. The access node can determine an optimal set of routing paths by determining a path quality of the available paths, and selecting the optimal paths based upon one or more selection criteria. The indicators can include beacons originating at the gateways. The beacons are retransmitted by upstream access nodes, after the beacons have been modified to include selected upstream routing information. The beacons can include hop indicators that are incremented with each hop. As stated above, a hop is that transmission of a beacon from a gateway or access node, to a downstream access node. The access nodes can also send a reverse beacons back to the gateways. The reverse beacons allow the gateways to construct a client tree, thereby providing each gateway with at least one path including multiple channels to all clients.

Although specific embodiments of the invention have been described and illustrated, the invention is not to be limited to the specific forms or arrangements of parts so described and illustrated. The invention is limited only by the appended claims.

What is claimed:

1. A method of selecting at least one routing path between an access node and at least one of a plurality of gateways comprising:
   at least one gateway originating and simultaneously broadcasting beacons from a plurality of radios over a plurality of channels, each channel different from other of the plurality of channels, at least one radio broadcasting the beacons over a corresponding one of the plurality of channels, the beacons being broadcast over each of the plurality of channels at a predetermined rate;
   the access node simultaneously receiving over a plurality of channels with a plurality of access node radios, at least one access node radio corresponding with each of the plurality of channels, beacons from at least one upstream access node or gateway, the beacons providing information of selected upstream paths between each of the upstream access nodes and the plurality of gateways; and
   the access node selecting a routing path between the access node and at least one of the plurality of gateways, based on a persistence of successfully received beacons, the selected routing path including multiple different channels;
   the access node simultaneously re-broadcasting beacons with the plurality of access node radios, the re-broadcast beacons corresponding to the selected routing path, over each of the plurality of channels, the rebroadcast beacons modified by the access node to include information of the selected routing path.

2. The method of claim 1, wherein the plurality of channels comprises transmission channels according to at least two of 802.11(a), 802.11(b), 802.11(g), 802.11(n) transmission protocols.

3. The method of claim 1, wherein the selection criteria is additionally based upon an information throughput of the routing paths.

4. The method of claim 1, wherein the selection criteria is additionally based upon a number of hops of the routing paths.

5. The method of claim 1, wherein beacons that are successfully received by the upstream access nodes are rebroadcast by the upstream access nodes over multiple different channels after the beacons have been modified to include selected upstream routing information of the upstream access nodes.

6. The method of claim 1, wherein selected upstream paths between each upstream access node and upstream gateways includes a combination of paths, over multiple different channels, and upstream paths are selected based on a persistence of successfully received broadcast and rebroadcast beacons.

7. The method of claim 1, wherein selected upstream paths between each upstream access node and upstream gateways are selected based upon path quality.

8. The method of claim 7, wherein the path quality is determined by an information throughput of the upstream paths.

9. The method of claim 7, wherein the path quality is determined by a number of hops included within the upstream paths.

10. The method of claim 1, further comprising the access node transmitting a modified beacon over a plurality of channels, the modified beacon including the optimal set of routing paths between the access node and the at least one upstream gateway.

11. The method of claim 1, further comprising:
   sending a reverse beacon to the gateway; and
   constructing a client tree in the gateway, wherein the gateway has at least one path including multiple channels to all clients.

* * * * *